United States Patent [19]

Pavlicevic et al.

[11] Patent Number: 5,933,445
[45] Date of Patent: Aug. 3, 1999

[54] COOLING SYSTEM FOR CATHODES IN DIRECT CURRENT ELECTRIC ARC FURNACES

[75] Inventors: Milorad Pavlicevic, Udine; Alfredo Poloni, Fogliano Di Redipuglia; Gianni Gensini, Buia; Nuredin Kapaj, Udine, all of Italy

[73] Assignee: Danieli & C. Officine Meccaniche SpA, Buttrio, Italy

[21] Appl. No.: 08/932,600

[22] Filed: Sep. 17, 1997

[30] Foreign Application Priority Data

Sep. 27, 1996 [IT] Italy .................................. UD96A0183

[51] Int. Cl.$^6$ ...................................................... H05B 7/06
[52] U.S. Cl. .................................................. 373/93; 373/74
[58] Field of Search ................................... 373/93, 90, 74, 373/72, 76, 95

[56] References Cited

U.S. PATENT DOCUMENTS

| | | | |
|---|---|---|---|
| 2,942,046 | 6/1960 | Johson et al. | 373/93 |
| 4,121,042 | 10/1978 | Prenn | 373/93 |
| 4,168,392 | 9/1979 | Prenn . | |
| 4,256,918 | 3/1981 | Schwabe et al. . | |
| 4,490,825 | 12/1984 | Persson . | |
| 4,559,630 | 12/1985 | Maes | 373/93 |
| 4,610,015 | 9/1986 | Hill et al. | 373/93 |

FOREIGN PATENT DOCUMENTS

| | | |
|---|---|---|
| 256072 | of 0000 | Germany . |
| 4130397 | 3/1993 | Germany . |
| 2176980 | 1/1987 | United Kingdom . |

*Primary Examiner*—Teresa Walberg
*Assistant Examiner*—Quang Van
*Attorney, Agent, or Firm*—Antonelli, Terry, Stout & Kraus, LLP

[57] ABSTRACT

Cooling system for cathodes, or electrodes, (11) in Direct Current electric arc furnaces, the cathodes (11) comprising a lower consumable graphite part (11a), from which the electric arc is sparked, associated at the upper part with a hollow metallic part (11b) by means of a joint (13), inside the metallic part (11b) there being included a closed cooling circuit (19) with water or other similar cooling fluid, defining an area of evaporation (17) arranged substantially in cooperation with the lower end of the metallic part (11b) and an area of condensation (18) arranged in cooperation with a desired upper area of the metallic part (11b), the area of condensation (18) cooperating with a heat exchanger (15) associated with the outer wall of the metallic part (11b), there also being included an ascending channel (14) for the steam (19a) from the evaporation area (17) to the area of condensation (18) and at least a descending channel (16) whereby the condensation descends, under force of gravity, from the area of condensation (18) to the area of evaporation (17), the descending channel (14) and ascending channel (16) communicating with each other in correspondence with the area of evaporation (17) and the area of condensation (18), the descending channel (16) corresponding with the inner wall of the metallic part (11b) and having an inferior section than the section of the ascending channel (14).

14 Claims, 2 Drawing Sheets

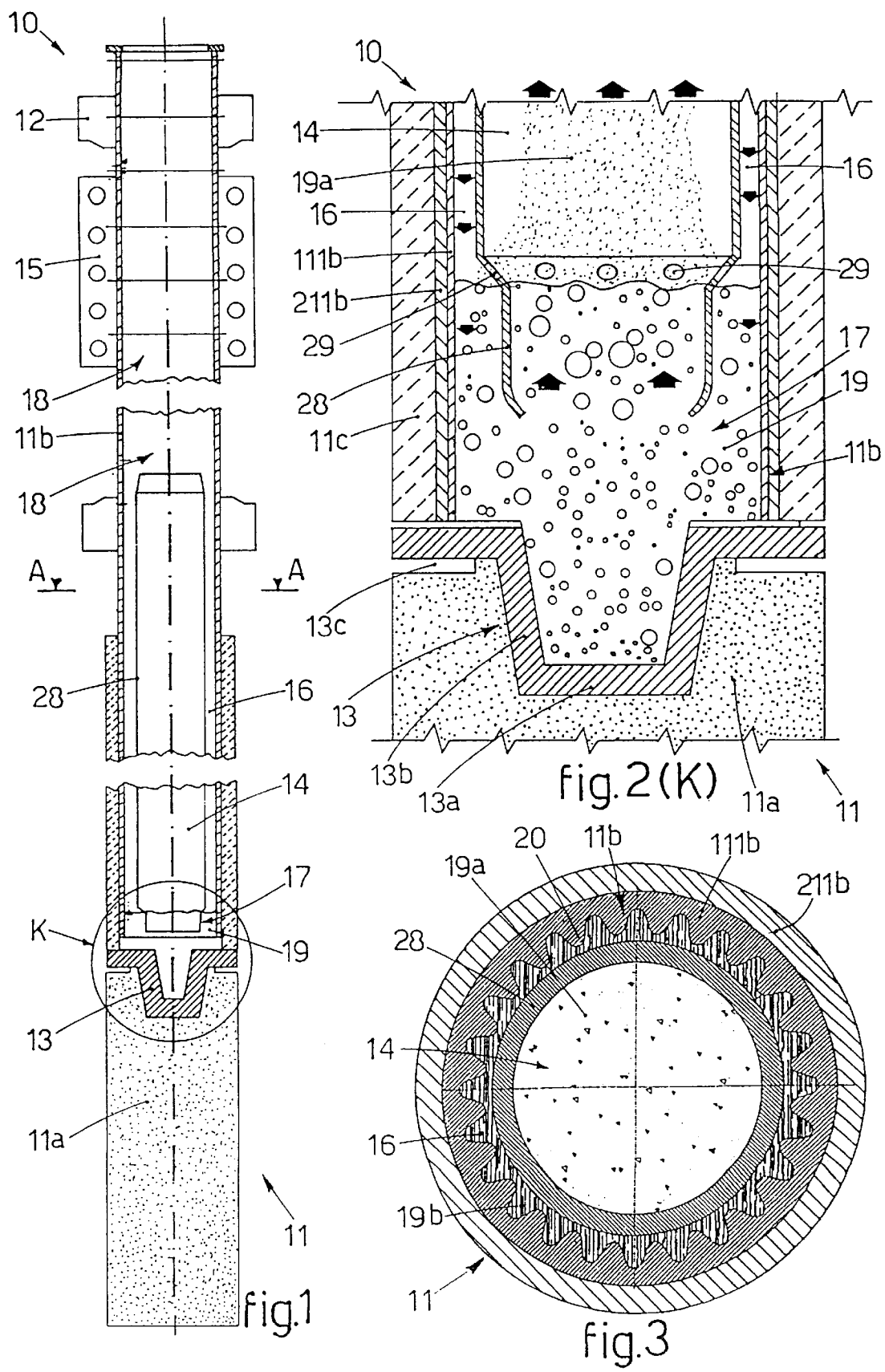

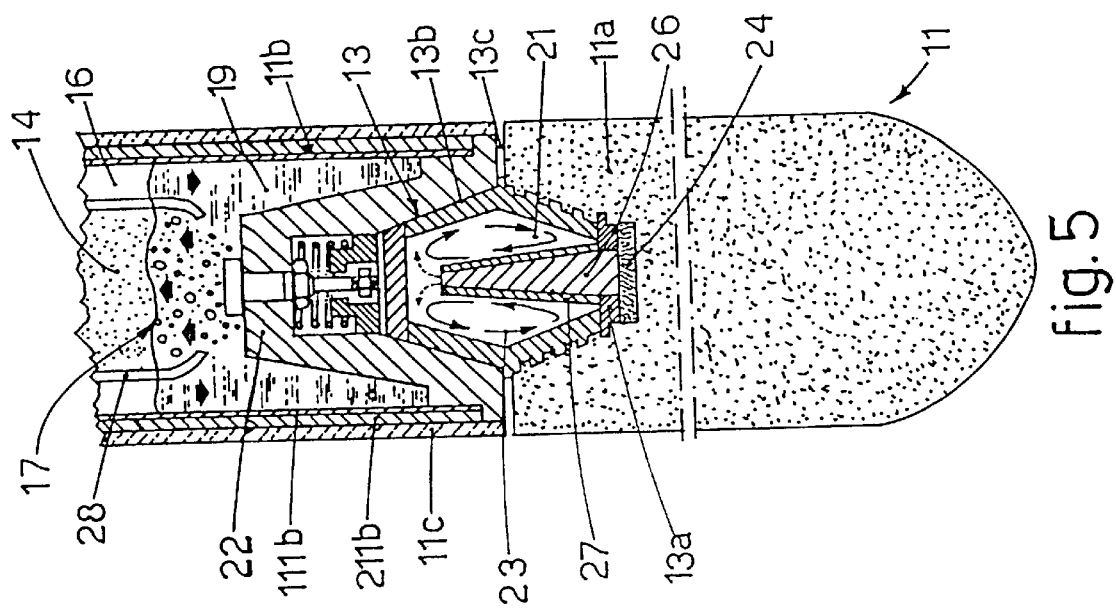
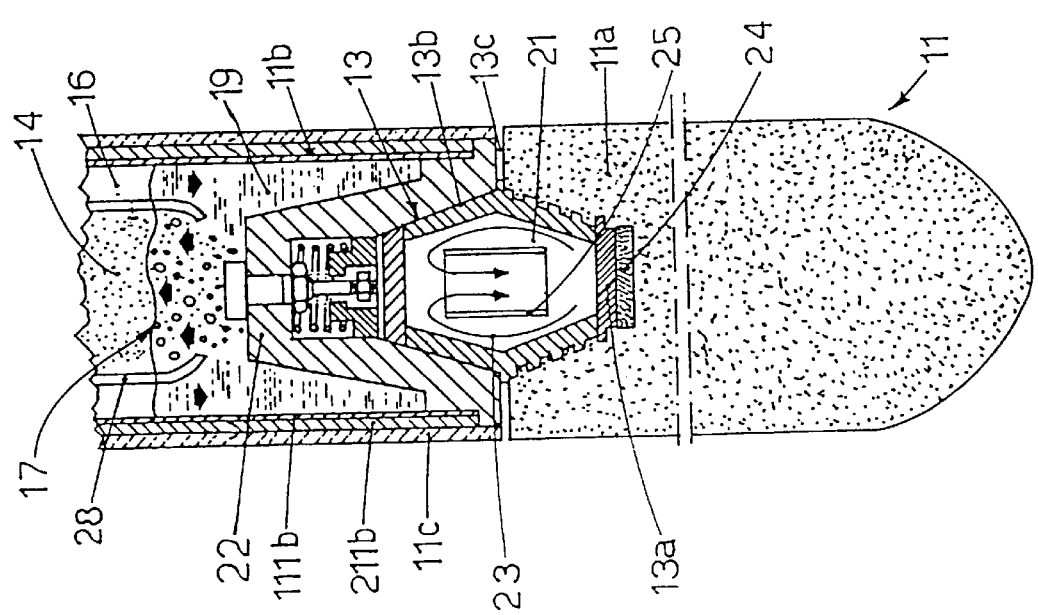

COOLING SYSTEM FOR CATHODES IN DIRECT CURRENT ELECTRIC ARC FURNACES

BACKGROUND OF THE INVENTION

This invention concerns a cooling system for Direct Current electric arc furnaces.

The invention is applied for the cooling of the cathode, or electrode, in a Direct Current electric arc furnace used for the melting of metal alloys.

The cathodes in electric arc furnaces are at present composed of two main parts: a lower part made of graphite, from which the electric arc is sparked, and an upper part made of a metallic material, which also functions as a bearing element, associated with the electrode-bearing arm of the furnace.

These two parts are constrained together by means of an intermediate joint, normally threaded, made of an electro-conductive material so as to allow the electric current to pass.

During the melting cycle, the graphite part reaches very high temperatures due to the electric arc, the passage of the electric currents used (Joule effect) and the heat exchange with the environment inside the furnace; the graphite part is thus progressively consumed, and is replaced by new segments of graphite from time to time. The high temperatures which can act on the graphite part cause the mechanical properties of the graphite to deteriorate, weakening the connection between the two parts of the cathode.

For this reason the cathode needs a cooling system which will act in correspondence with the metallic part and which is able to remove a large part of the heat which migrates from the graphite part towards the metallic part, allowing the desired temperature, both of the intermediate joint and of the metallic part, to be substantially controlled and maintained.

Some solutions include the use of traditional cooling systems with water, which however have not been considered satisfactory by operators in the field.

SUMMARY OF THE INVENTION

The present applicants have designed, tested and embodied this invention to overcome the shortcomings of the state of the art, and to obtain further advantages.

The purpose of the invention is to provide a cooling system for cathodes in Direct Current electric arc furnaces which will guarantee an efficient action to remove the heat not only from the metallic part bearing the cathode but also from the connecting joint between the graphite part and the metallic part of the cathode itself, maintaining substantially unchanged the electricity-conducting characteristics of the latter.

The system according to the invention includes a closed cooling circuit developing inside the cathode in correspondence with its metallic part. This circuit comprises ascending channels and descending channels for the cooling fluid, which communicate with each other substantially in correspondence with the extreme upper area and the extreme lower area of the metallic part of the cathode, and a heat exchanger located in correspondence with the upper area of the cooling circuit.

In one embodiment of the invention, the descending channel develops in correspondence with the side walls of the cathode.

According to a further embodiment, the ascending channel for the cooling fluid develops substantially in correspondence with the axis of the cathode.

According to the invention, the cooling fluid at ambient temperature and when the cathode is inactive, is in a liquid state and lies in correspondence with the lower area of the cooling circuit, therefore in correspondence with the joint, or area of evaporation of the cooling circuit.

Due to the heat developed by the electric arc, the passage of the electric current (Joule effect) and the heat exchange with the environment inside the furnace in the various steps of the melting process, the water reaches boiling temperature and evaporates.

The steam thus formed rises inside the ascending channel until it reaches the upper area of the circuit, called the condensation area, where it comes into contact with the "cold" walls of the metallic part of the cathode, where it condenses, giving up heat to the outer environment by means of the heat exchanger.

The drops of condensation which are deposited on these walls cause the formation of a film of water which, due to the effect of gravity, flows along the descending channel until it reaches the evaporation area, thus causing the metallic part of the cathode to be cooled.

Then, the condensation flows into the area of evaporation and is mixed with the water lying in that area, thus removing heat from the connecting joint of the cathode. Due to the latent energy which accompanies the change of step, a large quantity of heat is transferred from the area of evaporation to the area of condensation.

The heat exchange in this system is a function of the values of the coefficients of heat exchange in the evaporation and condensation steps.

The value of the relative coefficient in the evaporation step is largely a function of the entity of the heat flow.

Experimental measurements have shown that this value grows rapidly with the increase in the heat flow.

On the contrary, the value of the coefficient of heat exchange in the condensation step grows slightly at the beginning with the increase in the heat flow, but then is considerably reduced.

Keeping in mind that the value of the coefficient of heat exchange in the evaporation step is much higher than the value during the condensation step, it is extremely important, in order to dispose of the same amount of heat, to increase the surface of heat exchange in the area of condensation.

According to the invention, in order to obtain this increase in the heat exchange, an extensive surface is obtained, for example of an undulated or triangular configuration as seen in a cross section of the cathode, in correspondence with the area of condensation.

The heat exchange in a circuit of this type depends on various factors, such as the type and quantity of liquid in the circuit, the geometry of the circuit, the ratio of the evaporator/condenser lengths, the entity of the heat flow, the pressure inside the circuit, etc.

The choice of these parameters is important for the correct functioning of the system so that the phenomenon of boiling should take place, and so that there are no harmful phenomena such as burnout (dryout), or other shortcomings which drastically reduce the heat exchange.

In order to prevent such harmful phenomena, the cooling fluid used in the circuit occupies, according to the invention, a percentage of between 14% and 30%, advantageously between 18% and 20%, of the overall volume of the circuit.

According to another variant, the connecting joint between the graphite part and the metallic part of the cathode has inside itself a hollow which contains molten metal for removing heat.

This molten metal, which at ambient temperature is in its solid state, for example, in granular form, melts due to the effect of the electric arc, of the passage of the electric currents (Joule effect), and of the heat exchange with the environment of the furnace in the steps of the melting process.

The electric current which passes through the connecting joint causes the formation of vortexes in the molten metal inside the hollow, which allows the temperature of the joint itself to be made uniform.

According to a variant, the hollow includes inside itself a conveyor insert, made of a material with electroconductive characteristics at least higher than those of the connecting joint, this conveyor insert extending from the bottom towards the upper part of the hollow.

The conveyor insert forms the main transit path for the electric current from the graphite part to the metallic part of the cathode, defining a preferential rotary direction of the vortexes of the liquid inside the hollow.

The side walls of the conveyor insert are electrically shielded so as to concentrate the flow of current to the two ends of the insert itself.

According to another variant, this hollow includes a sub-division element defining substantially two concentric communicating conduits which create a preferential path for the liquid metal inside the hollow.

In one embodiment of the invention, the side walls of the metallic part of the cathode are composed of two concentric jackets closely associated together, of which one, either inner or outer, is made of copper or its alloys, and the other, outer or inner, is made of iron or its alloys.

According to a variant, in the separation area between the graphite part and the metallic part there is an air ring which has the function of directing the flow of electric current and therefore the heat into the central area of the cathode.

According to a further variant, on the lower face of the joint, in contact with the graphite part, there is an element in low-melting metal (for example, lead).

This element, as the electric current passes through it, melts and increases in volume, then rises along the joint and puts itself between the two parts of the joint, improving its mechanical connection and the passage of the current.

The cooling system according to the invention therefore makes it possible to cool the walls of the metallic part of the cathode and limit the flow of heat arriving from the graphite part, yet maintaining substantially unchanged the overall electroconductive characteristics of the cathode and therefore without causing imbalances as far as the functionality of the furnace is concerned.

According to the system of the invention moreover it is possible to make the temperature of the joint uniform and maintain it within the appropriate values, in order to guarantee the stability of the mechanical connection between the graphite part and the metallic part of the cathode; this stability is moreover increased due to the filling of the interstices between the parts of the joint by the melted metal.

BRIEF DESCRIPTION OF THE DRAWINGS

The attached figures are given as a non-restrictive example, and show a preferred embodiment of the invention as follows:

FIG. 1 shows a section of a cathode for electric arc furnaces adopting the cooling system according to the invention;

FIG. 2 shows the detail "K" of FIG. 1;

FIG. 3 shows on an enlarged scale the section A—A of FIG. 1;

FIG. 4 shows the lengthwise part section of a cathode for electric furnaces adopting the cooling system according to a variant of the invention;

FIG. 5 shows a variant of FIG. 4.

DETAILED DESCRIPTION OF THE PREFERRED EMBODIMENTS

The number 10 denotes generally the cooling system for cathodes 11 for Direct Current electric arc currents.

In this case, the cathode 11 includes at its lower part a graphite part 11a and at its upper part a hollow metallic part 11b, which also has a bearing function, and is associated with its own gripping means 12 of the electrode-bearing arm.

In this case, the main structure of the metallic part 11b is composed of two metal jackets or side walls closely associated together of which one, 111b or 211b, is made of copper or its alloys, and the other, 211b or 111b, is made of iron or its alloys.

This configuration of the metallic part 11b is particularly advantageous since it combines both characteristics of mechanical resistance and electric conductivity; moreover, the metallic part 11b is, at least in its lower part, outwardly covered by a layer of refractory material 11c.

The graphite part 11a and the metallic part 11b are associated to each other by means of a joint 13, in this case of the threaded type.

The joint 13 is associated at its upper part with a covering element 22, made in this case of a Cu/Ni alloy, inside of which there are the elements to adjust the connection between the metallic part 11b and the graphite part 11a.

According to the invention, the metallic part 11b includes inside an ascending channel 14, in this case developing coaxially to the side walls 111b, 211b, the side wall of which is defined by an axial conduit 28 which is open both towards the bottom and towards the top.

The ascending channel 14 extends, from the bottom to the top, from a level slightly above the bottom of the metallic part 11b itself up to a level which is lower than that of the heat exchanger 15 associated at the periphery with the sidewalls 111b, 211b at the upper part of the cathode 11.

The metallic part 11b, with this configuration, defines, between the side walls 111b, 211b and the axial conduit 28 defining the acsending channel 14, a descending channel 16 in this case toric in shape and with a very much smaller section compared with that of the ascending channel 14.

The two channels 14, 16 are inter-communicating in correspondence with the extreme lower part of the metallic part 11b, or area of evaporation 17, and the upper part of the metallic part 11b, or area of condensation 18.

According to the invention, the area of evaporation 17 is filled by a quantity of water 19 equal to 14–30% advantageously between 18% and 20%, of the inner volume of the metallic part 11b. The heat generated by the effect of the electric arc, the passage of the electric currents used (Joule effect) and the heat exchange with the environment inside the furnace during the various steps of the melting process, from the graphite part 11a towards the metallic part 11b, causes a rise in the temperature of the water 19 until it reaches boiling point, and therefore evaporates.

The particles of steam 19a generated, as they are lighter, rise along the ascending channel 14 until they reach the area of condensation 18, both from the open lower part of the axial conduit 28, and through intermediate holes 29 included on the circumference of the axial conduit 28.

In this area of condensation, the steam 19a comes into contact with the "cold" walls of the metallic part 11b, condensing and giving up heat to the outside environment by means of the heat exchanger 15. The drops of condensation are deposited on the inner side walls 111b of the metallic part 11b forming a film of water condensation 19b which runs inside the descending channel 16 and flows into the area of evaporation 17; this causes the cooling of the side walls 111b, 211b of the metallic part 11b.

In one variant of the invention shown in FIG. 3, the outer side walls 111b include finned extensions 20 which define a greater surface of heat exchange for a more efficient process of condensation.

According to the variants shown in FIGS. 4 and 5 the joint 13 includes inside itself a hollow 21 which contains melted metal as a cooling fluid.

The passage of the electric current through the joint 13 causes, inside the hollow 21, the formation of streams 23 of cooling fluid which make the temperature of the joint 13 uniform and thus improve its cooling conditions and therefore making the mechanical connection between the graphite part 11a and the metallic part 11b more stable and secure.

According to a further variant, an element 24 made of low-melting metal, for example lead, is placed between the bottom 13a of the joint 13 and the graphite part 11a.

The element 24 melts as an effect of the heat generated by the passing of the electric current and increases in volume, thus filling the interstices, in this case consisting of fissures between the cooperating threads, between the joint 13 and the graphite part 11a.

The hollow 21 of FIG. 4 includes inside a sub-division element 25 mounted coaxially with respect to the hollow so as to define substantially two conduits, one inside the other, communicating with each other in correspondence with the upper part and the lower part of the hollow 21.

According to this variant, the electric current travelling along the side walls 13b of the joint 13 causes the formation of vortical streams 23 of cooling fluid with a preferential path rising in correspondence with the side walls themselves 13b and descending inside the conduit defined inside by the sub-division element 25.

According to the other variant of FIG. 5 the hollow 21 includes inside and in correspondence with its own longitudinal axis a conveyor insert 26 which extends from the bottom towards the top of the same.

The conveyor insert 26 is made of a material with high electroconductivity (for example, copper) constituting a preferential passage way of the electric current through the joint 13. The conveyor insert 26 is moreover lined with a layer of electrically insulated material 27, which directs further outwards the flow of electric current towards the top of the conveyor insert 26.

The passage of the electric current in correspondence with the axis of the joint 13 and then of the relative inner hollow 21, defines inside the latter a preferential path for the vortical streams 23 of the cooling fluid. These streams 23 descend in correspondence with the side walls 13b of the joint 13 and then re-ascend in the proximity of the conveyor insert 26.

According to the invention, in order to limit as much as possible the passage of the current and therefore the flow of heat into the peripheral areas of the cathode 11, the joint 13 includes, in its outer part, an air ring 13c to separate it from the graphite part 11a. The presence of the air ring 13c causes the electric current and the relative flow of heat generated to be spread mainly through the side walls 13b of the joint 13, that is to say, into the area of greatest efficiency of the cooling system 10.

We claim:

1. An electrode having a cooling system for direct current electric arc furnaces, comprising a lower part made of consumable graphite, from which the electric arc is sparked, associated at an upper end with a hollow metallic part by means of a joint, the cooling system being characterized in that, inside the metallic part, there is included a closed cooling circuit with a cooling fluid, defining an area of evaporation arranged substantially in cooperation with a lower end of the metallic part and an area of condensation arranged in cooperation with an upper area of the metallic part, the area of condensation cooperating with a heat exchanger associated with an outer wall of the metallic part, an ascending channel for steam from the area of evaporation to the area of condensation and a descending channel for condensation to descend, under the force of gravity, from the area of condensation to the area of evaporation, the ascending channel and descending channel inter-communicating with each other in correspondence with the areas of evaporation and condensation, the descending channel cooperating with an inner wall of the metallic part and having an inferior section than that of the ascending channel.

2. An electrode as in claim 1, in which the cooling fluid, at ambient temperature and when the electrode is inactive, consists of a quantity of water equal to 14–30% of an inner volume of the metallic part.

3. An electrode as in claim 1, in which the ascending channel is defined by an axial conduit extending from the area of evaporation to the area of condensation and the descending channel is defined by a space included between the axial conduit and the inner wall of the metallic part of the electrode.

4. An electrode as in claim 3, in which the axial conduit includes, in the area immediately above the area of evaporation, intermediate passage holes, through which the steam can pass, and communication is achieved between the descending channel and the ascending channel.

5. An electrode as in claim 1, in which the metallic part comprises two jackets associated closely together, one of which is made of copper or its alloys and another of which is made of iron or its alloys.

6. An electrode as in claim 1, in which the inner wall of the metallic part includes finned extensions in order to increase heat exchange at least in correspondence with the area of condensation.

7. An electrode as in claim 1, in which the joint includes inside itself a hollow containing melted metal for the dispersion of heat.

8. An electrode as in claim 7, in which the melted metal, when the furnace is inactive, is in its solid state and during the melting process melts as a result of the temperature generated by the electric arc, of the passage of electric currents and of the heat exchange with the environment inside the furnace.

9. An electrode as in claim 7, in which the hollow includes a sub-division element defining an axial conduit open both towards the top and towards the bottom.

10. An electrode as in claim 7, in which a bottom of the hollow includes a conveyor insert for the electric current which extends lengthwise towards outside of the hollow.

11. An electrode as in claim 10, in which the conveyor insert includes on its side periphery a layer of electrically insulating material.

12. An electrode as in claim 1, in which in cooperation with the joint there is an element made of low-melting metal to disperse the heat and occlude the interstices.

13. An electrode as in claim 1, in which in correspondence with the separation area between the graphite part and the metallic part there is an air ring (13*c*).

14. An electrode as in claim 1, in which the electrode is a cathode of a direct current electric arc furnace.

* * * * *